Dec. 1, 1964    R. N. SARGENT    3,159,632
REPETITIVE PROCESS FOR THE REMOVAL AND/OR RECOVERY
OF AMINES FROM AQUEOUS SOLUTIONS
Filed Nov. 25, 1960    2 Sheets-Sheet 1
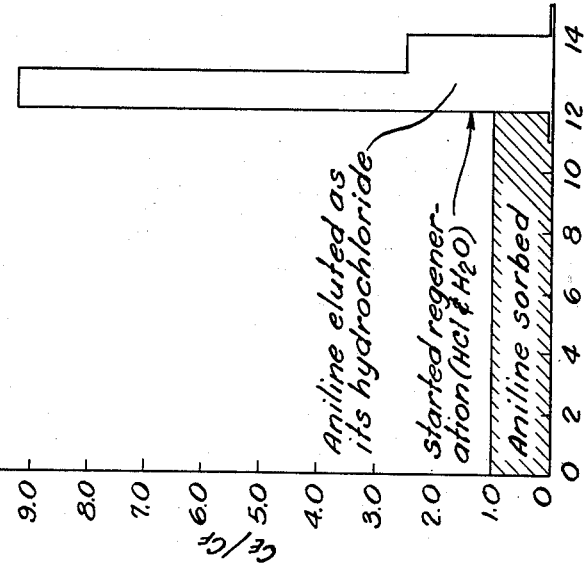
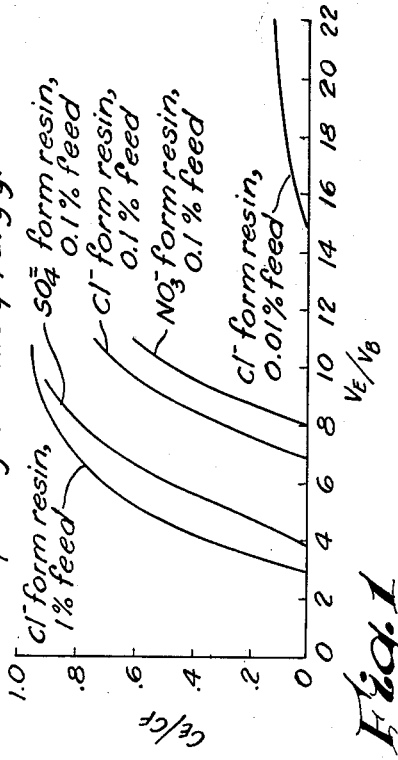
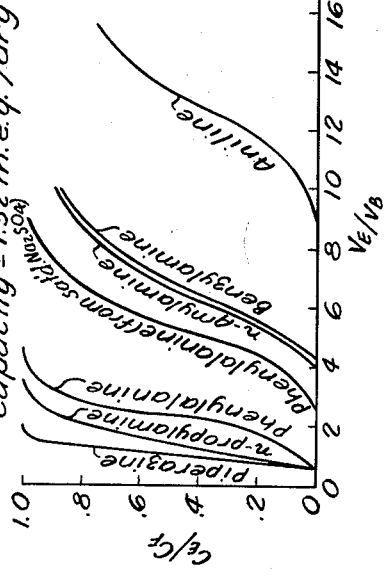
INVENTOR.
Roger N. Sargent
BY Theodore Post
ATTORNEY Dec. 1, 1964 R. N. SARGENT 3,159,632
REPETITIVE PROCESS FOR THE REMOVAL AND/OR RECOVERY
OF AMINES FROM AQUEOUS SOLUTIONS
Filed Nov. 25, 1960 2 Sheets-Sheet 2
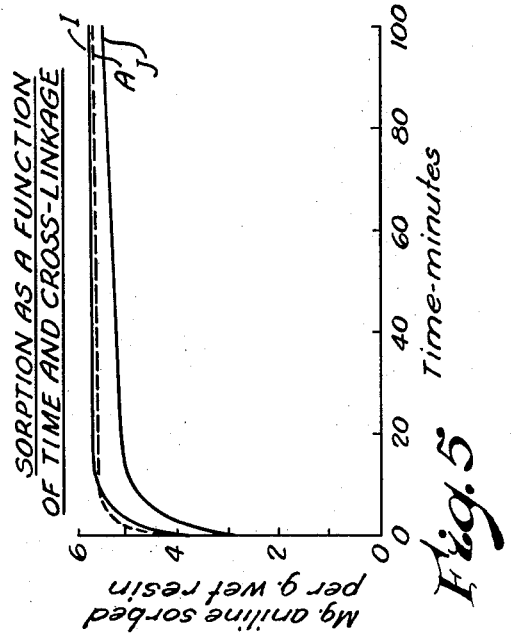
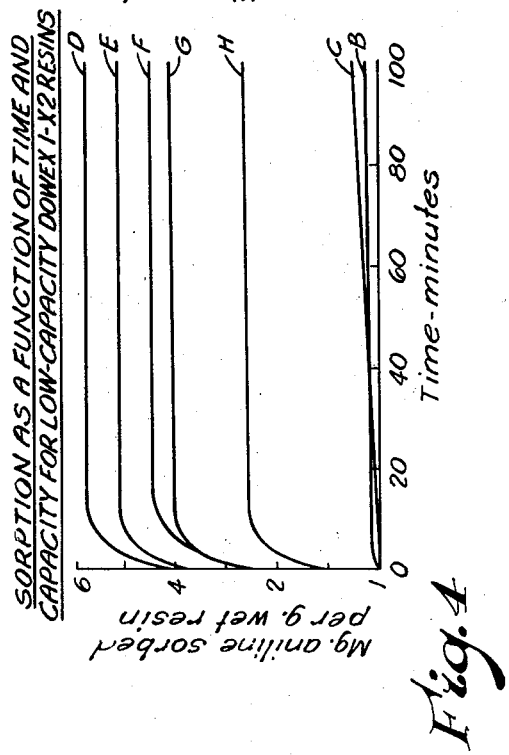
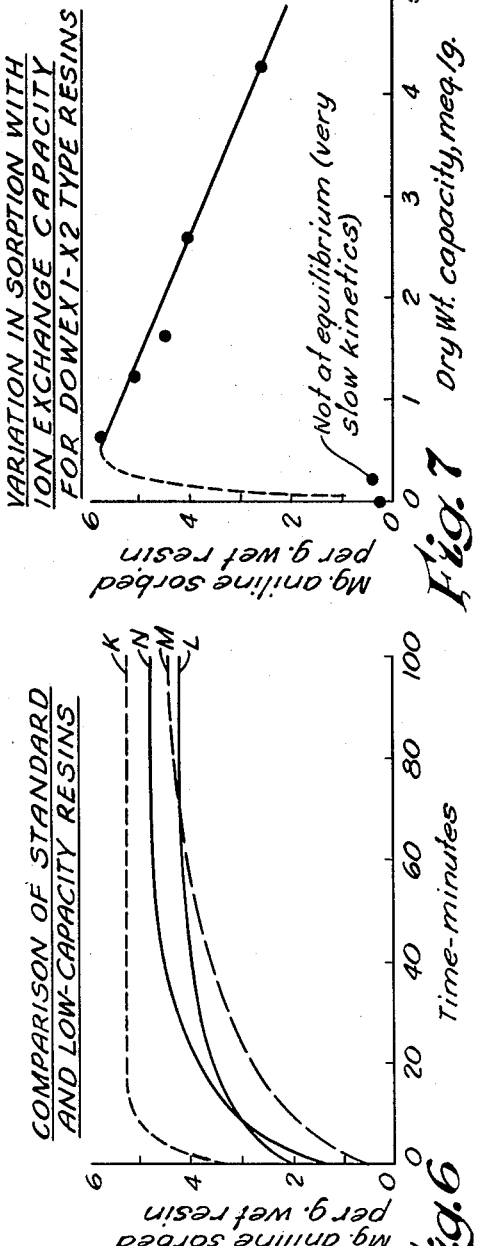
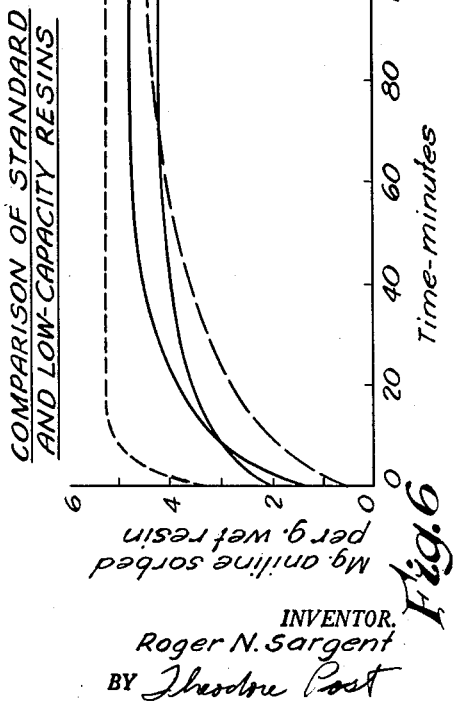
INVENTOR.
Roger N. Sargent
BY *Theodore Post*
ATTORNEY

United States Patent Office 3,159,632
Patented Dec. 1, 1964

3,159,632
REPETITIVE PROCESS FOR THE REMOVAL AND/OR RECOVERY OF AMINES FROM AQUEOUS SOLUTIONS
Roger N. Sargent, Midland, Mich., assignor to The Dow Chemical Company, Midland, Mich., a corporation of Delaware
Filed Nov. 25, 1960, Ser. No. 71,515
9 Claims. (Cl. 260—268)

This invention concerns a method for removing and recovering amines from their aqueous solutions by molecular sorption on anion exchange resins and elution therefrom with aqueous strong mineral acid.

It is well known that organic compounds including organic basic compounds can be sorbed from their aqueous solutions by the use of sorbents such as charcoal. However, after the sorption capacity of such sorbents has been reached, the loaded sorbent is generally discarded because of difficulty in its reactivation. To make the removal of organic basic compounds from their aqueous solutions economical, the sorbent should be easily reactivated, i.e., regenerated. If easily regenerated, the effluent from the regeneration will contain the sorbed species in high concentration, which will make its recovery more advantageous.

This invention concerns a process for removing amines from their aqueous solutions by molecular sorption on anion exchange resins and recovering the amines as their protonated salts by treatment of the loaded anion exchange resin with an aqueous solution of a strong mineral acid. The protonated salt of the amine is not appreciably sorbed by the anion exchange resin due to its ionic nature and can be rinsed from the resin's interstitial solution with a small volume of water.

Cation exchange resins, although widely used in the hydrogen form for the sorption of amines from aqueous solutions, can not be used in the process of this invention because the elution of the amine, B as its protonated salt, $HB^+$, would be incomplete due to ion exchange with the resin $\overline{R}^-$, as shown by the following equation:

B (sorbed on resin) + $H^+$ ⟶

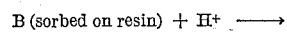

$HB^+$ 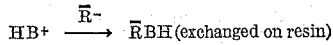 $\overline{R}BH$ (exchanged on resin)

The anion exchange resins used in the process of this invention include the resinous condensation products of phenol, formaldehyde and amines, particularly alkylene polyamines and polyalkylene polyamines, which are described in U.S. Patent No. 2,341,907; the nitrogen-containing resinous compositions comprising the reaction product of a primary or secondary amine or an alkylene polyamine or polyalkylene polyamine and a halomethylated crosslinked copolymer of a monovinyl aromatic hydrocarbon and divinyl aromatic hydrocarbon, which are described in U.S. Patent No. 2,591,574; the strongly basic quaternary ammonium anion exchange resins comprising the reaction products of a tertiary amine and a halomethylated insoluble crosslinked vinylaromatic resin, such as the resinous compositions which are described in U.S. Patent Nos. 2,591,573 and 2,614,099; and the sulfonium anion exchange resins, made by reacting a halomethylated crosslinked copolymer of a monovinylaryl hydrocarbon and a divinylaryl hydrocarbon with a dialkyl, a dihydroxyalkyl or an alkyl hydroxyalkyl sulfide, as described in an application Serial No. 765,545, filed October 27, 1958, and now Patent No. 3,115,449. The strongly basic quaternary ammonium anion exchange resins are preferred.

Advantageously and preferably, the process of this invention uses those anion exchange resins which have an ion exchange capacity considerably lower than that of their commercially-available analogs, e.g., 5–80% that of the conventional or full capacity resins, and having a capacity of at least 0.5 meq./q. (milliequivalent per gram) of dry resin. However, it is not essential in the process of this invention to use anion exchange resins having such a lower capacity, since conventional anion exchange resins are operable.

The low-capacity anion exchange resins that are most advantageously used in the process of this invention are the low-capacity, quaternary ammonium types. They are made advantageously by swelling a polymeric alkenylaromatic resin (e.g., a resinous polymer of styrene, vinyltoluenes, vinylxylenes, vinylnaphthalenes, vinylethylbenzenes, α-methylstyrene, vinylchlorobenzenes, etc., or mixtures thereof) crosslinked with between 0.1 and 10 mole percent (preferably 1 to 4%) of a dialkenyl crosslinking agent (e.g., divinylbenzenes, divinyltoluenes, divinylxylenes, divinylnaphthalenes, divinylethylbenzenes, diallyl esters, diacrylate esters, etc., or mixtures thereof) with a swelling agent which is also an inert solvent for chloromethyl methyl ether. The swollen polymer is then chloromethylated with chloromethyl methyl ether to the extent of 5 to 60% of the available aryl nuclei in known manner. The chloromethylated polymer is then reacted with an amine, e.g., trimethylamine, dimethylethanolamine, ethylenediamine, etc., depending upon which anion exchange resin is desired, according to established procedures for reacting chloromethylated poly(vinylaryl) resins with amines.

Alternatively, a polymeric vinylbenzyl chloride resin having 5 to 60 mole percent combined vinylbenzyl chloride, the balance of the polymer being at least one other combined monoalkenylaryl comonomer, said polymer being crosslinked with ca. 0.1–10 mole percent of a dialkenylaryl crosslinking agent, can be reacted with an amine pursuant to conventional procedures to give a low-capacity anion exchange resin quite useful in the practice of this invention.

The functional groups on the low-capacity anion exchange resins are advantageously evenly distributed throughout the matrix of the resin bead.

Amines that can be removed and recovered pursuant to the process of this invention are the amines and substituted amines, e.g., mono-, di- or trialkyl, aryl, aralkyl, cycloalkyl, alkoxy, etc., amines or polyamines in which the alkyl, aryl, aralkyl and cycloalkyl groups may contain polar or nonpolar substitutents, e.g., hydroxyl, carboxyl, halo, nitro, alkoxy and the like. Examples of amines that can be removed and/or recovered from their aqueous solutions pursuant to the process of this invention are mono-, di- and triethylamine, benzylamine, aniline, pyridine, quinoline, tetraethylenepentamine, cyclohexylamine, α-naphthylamine, o-aminophenol and the like.

The amine is sorbed in the molecular or nonprotonated form. The extent to which it is protonated (and, hence ionized) will lower the quantity sorbed by a salt form of the resin. It is therefore necessary that the solution of the amine be sufficiently basic, e.g., at a pH of about 9 or greater, to suppress protonation. If the amine solution is acidic, the solution can be made basic in the usual way. The presence of ionic neutral or basic salts in the solution of the amine to be sorbed is not detrimental to the process of this invention. In fact, the sorption of amines from aqueous solutions which contain no dissolved salts would probably be best carried out on the hydrogen form of a strongly acidic cation exchange resin. In solutions containing salts or alkali in high concentration relative to the amine, however, the capacity of a cation exchanger would be exhausted primarily by the salts or alkali, making the removal and/or recovery of the amine by such a method uneconomical.

The sorption step can be carried out on any anionic form of an anion exchange resin including the free base or hydroxide forms, but some forms will sorb the amine to a greater extent than others, e.g., $NO_3^- > Cl^- > SO_4^=$, as shown in accompanying FIGURE 1. The use of polyvalent anionic forms of resin such as the sulfate or phosphate form will necessitate the use of excess acid since the anion itself tends to protonate with the acid used in the regeneration. Furthermore, a greater volume of water rinse is then required to rinse the acid from the resin before the next cycle can be started. For example, treatment of an amine sorbed on the sulfate form of resin with sulfuric acid will protonate both the amine B and the sulfate ion on the resin $\overline{R}$, a shown in the following equation:

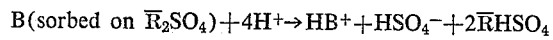

The amine is readily eluted from the resin in the bisulfate form with water but before the resin is considered regenerated, an additional quantity of water or an equivalent quantity of a strong base must be passed through the resin to convert it from the bisulfate form to the sulfate form, as shown in the following equations:

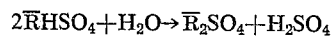

and

For these reasons, an anion exchange resin is advantageously used in a univalent anionic form such as the chloride or nitrate, and the resin is regenerated with the corresponding acid of the anion. If the free base or hydroxide form of a resin is used, an amount of acid equivalent to both the sorbed amine and the capacity of the resin would be required for regeneration.

To eluate the sorbed amine from the resin requires a quantity of strong mineral acid, advantageously as an aqueous 1–10% solution, in excess of the equivalent quantity of sorbed amine and the capacity of free base or hydroxide resin, if such a resin is used, advantageously up to 10% excess. Treatment of the loaded resin with acid followed by a water rinse simultaneously regenerates the resin for another sorption cycle and eluates the amine as its salt.

As a general rule, the more hydrophobic amines, e.g., aniline, sorb more tenaciously than the hydrophilic amines, e.g., n-propylamine, as indicated by the breakthrough curves of various amines, given in accompanying FIGURE 2. Similarly, a compound which contains two amino or imino groups is less tightly held than a monoamine of the same solubility in water.

In practice, the water-wet anion exchange resin in the desired anionic form is contacted with the aqueous solution of the amine to be sorbed. Advantageously, the solution is fed to a bed of the water-wet resin at a rate such that the amine is substantially completely sorbed by the resin and is removed from solution. A simple breakthrough curve determination provides such information. Preferably at, or just before, the breakthorugh of the amine, the resin is washed with an aqueous solution of a strong mineral acid to convert the amine to its protonated salt which can be rinsed from the bed with a small volume of water. Usually about one bed volume of water rinse is required to rinse the protonated amine from the resin's interstitial solution. Two or more beds can be operated in parallel so that while one bed is being regenerated, another bed is being used to sorb the amine from its solution. The flow of feed and regenerant solutions may be either upwards or downwards through the bed. The amine being recovered in the regeneration effluent as its protonated salt at considerably higher concentration than in the feed, can be recovered more economically from the solution by usual techniques such as distillation, crystallization or extraction, if desired. The sorption process can be carried out at a temperature above the freezing point and below the boiling point of the amine solution. Similarly, elution is carried out at a temperature above the freezing point and below the boiling point of the eluant. However, room temperature or substantially room temperature sorption and elution are most convenient.

Alternatively, the aqueous solution of the amine can be contacted batchwise with the anion exchange resin until equilibrium is reached or is substantially reached. The resin is then separated from the residual liquor by filtration and treated with aqueous mineral acid and water rinses to remove the amine and regenerate the resin.

The following examples describe completely specific embodiments and the best mode contemplated by the inventors of carrying out their invention. They are not to be considered limitative of the invention, which is defined in the claims.

Example 1

Aqueous solutions containing 1.0, 0.1 and 0.01 weight percent benzylamine were passed downflow through identical 38.5 cm.×0.65 cm.$^2$ (25 ml.) cylindrical beds of a low-capacity poly(vinylbenzyl trimethylammonium) resin in the chloride form crosslinked with 2 weight percent divinylbenzene (DVB hereafter) having a dry weight capacity of 1.32 meq./g. (milliequivalent per gram) and a water content of 36.3 weight percent. The flow rate for all runs was 0.5 g.p.m./ft.$^2$ (gallons per minute per square foot). Effluent cuts were taken and analyzed for benzylamine by U.V. absorption at 257 $\mu$. The breakthrough curves are shown in FIGURE 1 along with similarly run breakthrough curves of 0.1% benzylamine on beds of the same resin in the nitrate and sulfate forms. In this and other figures, C represents concentration and V represents volume. The subscripts E, F and B represent, respectively, effluent, feed and bed.

Example 2

Using the same resin and conditions as were used in Example 1, aqueous 0.1% solutions of aniline, benzylamine, n-propylamine, piperazine and phenylalanine were passed through identical beds of resin in the sulfate form to obtain breakthrough curves, shown in FIGURE 2. $\alpha$-Naphthylamine was also run as above but none of this solute was found in the effluent up to 33 bed volumes, when the run was discontinued. The graphs in FIGURE 2 and the fact that no breakthrough was observed with $\alpha$-naphthylamine, as stated, clearly show that hydrophobic amines such as $\alpha$-naphthylamine and aniline are more effectively sorbed than the more hydrophilic and/or polyfunctional amines such as n-propylamine and piperazine. Phenylalanine was also sorbed from a solution saturated with sodium sulfate. In all cases above, the amine was eluted as the hydrosulfate by reaction on the resin beds with excess 0.1-normal sulfuric acid followed by a water rinse.

Example 3

A quantity of 300 ml. of an aqueous 0.1% solution of aniline was passed through a 25 ml. bed of the chloride form of the resin used in Example 1. After the bed was loaded, a 10% molar excess of hydrochloric acid (3.50 ml. of one-normal HCl) was passed through the bed to convert the aniline to its hydrochloride. The aniline hydrochloride was readily rinsed from the bed with a small volume of water. Results of this example are given in FIGURE 3.

Example 4

A series of anion exchange resin beads was prepared according to procedures outlined above, for aniline sorption comparisons with standard anion exchange resins and with a resinous polymeric styrene-divinylbenzene copolymer crosslinked with 2% divinylbenzene, the resins being identified by code letters and by their characteristics in the following table.

Approximately an 8 g. quantity of each of such resins, in the chloride form except for the styrene-divinylbenzene copolymer, was centrifuged from an aqueous suspension and accurately weighed in water-wet form into a small bottle. A quantity of 50 ml. of aqueous 0.1% aniline was added thereto. The bottles were shaken for a total of 100 minutes. At intervals of 10, 45 and 100 minutes, 2 ml. of the solution phase was withdrawn from each bottle and analyzed for aniline. As shown in the following table and in FIGURES 4-7, sorption of aniline increases with decreasing capacity of the resin, except for resins outside the scope of this invention, i.e., resins C and B. Resins having 4 and 8% crosslinkage, i.e., I and J, show increased equilibrium sorption but with decreased rate of sorption. Standard anion exchange resins, e.g., L and N, have rather high distribution ratios, $K_d$, and are effective for the sorption of aniline and other amines.

2. The method of claim 1 wherein a salt form anion exchange resin is used which has a capacity of at least 0.5 milliequivalent per gram, dry basis, and up to that of a conventional full capacity anion exchange resin.

3. The method of claim 2 wherein the resin has quaternary ammonium salt anion exchanging groups.

4. The method of claim 1 wherein the amine is benzylamine.

5. The method of claim 1 wherein the amine is aniline.

6. The method of claim 1 wherein the amine is piperazine.

7. The method of claim 1 wherein the amine is n-propylamine.

8. The method of claim 1 wherein the amine is n-amylamine.

TABLE.—SORPTION OF ANILINE BY VARIOUS RESIN BEADS

| No. | Type | Crosslinkage, Wt. percent DVB | Capacity, meq./dry g. | Water Content, percent | Equilibrium Sorption, mg./wet g. | $K_d$[1] (100 Min.) |
|---|---|---|---|---|---|---|
| A | Poly(vinylbenzyl trimethyl ammonium chloride) | 1 | 0.76 | 36.5 | 5.74 | 116 |
| B | Polystyrene | 2 | 0.00 | 0.00 | [2](0.234) | |
| C | Same type as A | 2 | 0.24 | 27.0 | (0.44) | (>1.77) |
| D | do | 2 | 0.64 | 30.2 | 5.82 | 126 |
| E | do | 2 | 1.23 | 37.6 | 5.18 | 89.8 |
| F | do | 2 | 1.61 | 47.3 | 4.54 | 36.7 |
| G | do | 2 | 2.59 | 59.7 | 4.12 | 23.8 |
| H | Standard type A (Dowex 1-X2 resin) | 2 | 4.28 | 75.0 | 2.67 | 6.43 |
| I | Same type as A | 4 | 1.45 | 31.5 | 5.75 | 122 |
| J | do | 8 | 0.94 | 19.6 | (5.52) | (>256) |
| K | Poly(vinylbenzyl dimethyl etahnolammonium chloride) | 2 | 1.43 | 39.0 | 5.03 | 45.5 |
| L | Standard type K (Dowex 2-X8 resin) | 8 | 3.59 | 36.5 | 4.23 | 36.9 |
| M | Poly(vinylbenzyl polyalkylene polyamine) | 2 | 4.67 | 20.0 | (4.48) | (>58.5) |
| N | Standard type M (Dowex 3-X4 resin) | 4 | 5.50 | 36.8 | 4.84 | 47.8 |

[1] $K_d$ Distribution ratio=molarity of aniline in the water inside the resin bead÷molarity of aniline in the external solution at equilibrium.
[2] Values in parentheses were not at equilibrium at 100 min.

What is claimed is:

1. A method for removing an organic amine as free base from an aqueous solution thereof having a pH at least 9 by contacting said solution with a water-wet anion exchange resin having an ion exchange capacity of at least 0.5 milliequivalent per gram of dry resin and an ion exchange capacity of 5 to 80 percent that of a conventional full capacity resin whereby said amine is molecularly sorbed on said resin and removing said sorbed amine from said resin as a salt by reaction on the resin with an excess of mineral acid up to about 10% over that required to form the amine salt, and eluting said amine salt with water.

9. The method of claim 1 wherein the amine is phenylalanine.

References Cited in the file of this patent

UNITED STATES PATENTS 2,941,995  Doyle et al. _____ June 21, 1960
2,949,450  Stark _____ Aug. 16, 1960
2,987,441  Brudney _____ June 6, 1961

OTHER REFERENCES

Helfferich: Ion Exchange, page 148 (1962), translation of the German "Ionenaustrauscher" (1959).